Patented June 19, 1923.

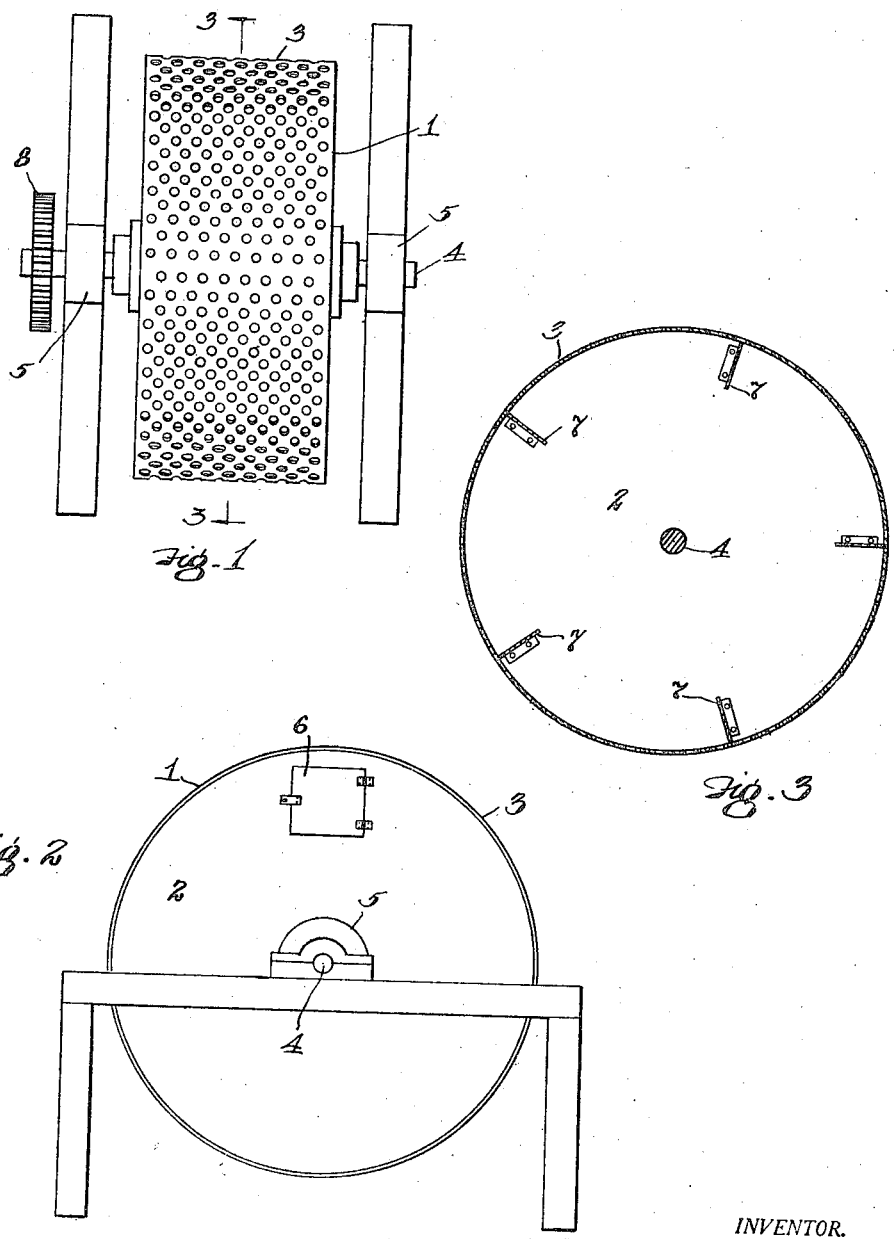

1,459,143

UNITED STATES PATENT OFFICE.

M DONOVAN CURRAN, OF TOLEDO, OHIO.

TESTING COKE.

Application filed August 20, 1921. Serial No. 493,822.

*To all whom it may concern:*

Be it known that I, M DONOVAN CURRAN, a citizen of the United States, and a resident of Toledo, county of Lucas, and State of Ohio, have invented a new and useful Improvement in Testing Coke, of which the following is a specification, the principle of the invention being herein explained and the best mode in which I have contemplated applying that principle, so as to distinguish it from other inventions.

Various attempts have been made to measure the physical values of coke, especially in connection with its use in the smelting of ores for the manufacture of metals, such as iron, copper, lead, zinc, etc., and in the founding of such metals as these. So far as I am aware, however, no method for thus measuring such values in the case of the particular material named has heretofore been discovered whereby it is possible to determine the ultimate strength, hardness, brittleness and toughness accurately without detailed and expensive tests.

The object of the present invention is to provide a method of testing coke whereby the aforesaid physical properties may be determined by subjecting the material in question to certain physical strains which permit such properties to reveal themselves, and which can be measured as to their effect by means of sizing. In this way I am enabled to calculate such physical properties by the use of certain equations which I have formulated and which are hereinafter fully described, together with the steps constituting my novel method or process, and are particularly pointed out in the claims; the annexed drawing and the following description setting forth in detail certain mechanism or apparatus whereby such improved method or process may be carried out, such disclosed means illustrating, however, but one of various ways in which the principle of the invention may be used.

In said annexed drawing:—

Fig. 1 is a plan view of such illustrative apparatus; Fig. 2 is an end elevation thereof; and Fig. 3 is a transverse section, the plane of the section being indicated by the line 3—3, Fig. 1.

The apparatus or mechanism shown in the aforesaid drawing comprises simply a cylinder or drum of suitable dimensions that is made up of two solid steel ends 2 and a perforated shell 3, such cylinder being rotatably supported about its axis by means of a shaft 4 resting in bearings 5. As shown in Fig. 2, one of the end plates is provided with a suitable door 6 whereby access may be had to the interior of the drum for the introduction of material to be tested or for other purposes; and as shown in Fig. 3 a series of transversely disposed shelves 7 is provided interiorly of the drum, such shelves extending radially inwardly from the perforated shell 3 for a fractional part of the distance from the latter to the axis of the drum. For rotating the latter mechanical power is applied in any convenient way to the shaft 4, as, for example, through a gear 8 affixed thereon.

In operation a certain weight of coke is placed in the cylinder through the door 6, which is then closed and fastened and the cylinder revolved for a certain length of time, or number of revolutions, the rate of revolution being such as to allow the force of gravity to overcome the centrifugal force produced by revolution; and thereby permit the coke to fall from the shelves 7 before they reach their highest elevation.

As the drum thus rotates it will be obvious that any particles that are of small enough size to pass through the perforations in shell 3 will escape from the drum. As a basis for the calculation of the physical properties of the coke being tested, the portion remaining on the inside of the drum, after prescribed rotation of the latter, is removed and screened over a given size screen or screens, and the amounts remaining on each screen and passing therethrough carefully weighed. Also the coke which passed through the perforated shell of the cylinder is screened over given size screens and the amounts remaining on each screen and passing through each screen are weighed. These various weights I have found may then be applied to certain equations which I have worked out to give the ultimate strength, hardness, brittleness and toughness of the material.

The following calculation is given by way of example, being based on the use of a cylinder or drum five feet and eight inches in diameter and two feet and ten inches wide, with perforations in the shell one and one-half inches in diameter, spaced two and one-half inches apart, center to center. Such cylinder is revolved at the rate of ten revolutions per minute for twelve minutes, or a total of 120 revolutions. The coke remaining in the drum is then removed and screened over a two-inch mesh screen and the weight of the material which passes through the two-inch mesh screen is obtained. In like manner the material which passes through the perforated shell while the cylinder is being revolved is screened over a seven-eighth inch mesh screen and a five-eighth inch mesh screen and the weight of the portions of such material which passes through said screens, respectively, is obtained.

The weights obtained, as aforesaid are then inserted in certain general equations, in which the several letters have the following significance, viz, T = The weight of coke used in the test,
R = The weight remaining inside the cylinder after revolving,
A = The weight retained on the two inch mesh screen,
B = The weight of the coke passing through the two inch mesh screen and retained on a one and one-half inch mesh screen,
C = The weight which passed through the one and one-half inch mesh screen and was retained on the seven-eighths mesh screen,
D = The weight of the total coke which passed through the perforations of the cylinder while it was being revolved,
E = The weight of the coke which passed through the five-eighths inch mesh screen,
F = The weight of the coke which passed through the seven-eighths inch mesh screen.

The equations or formulas in which the weights indicated by the foregoing letters are inserted are as follows:—

(1) Ultimate strength =
$$\left(\frac{A}{R} \times \frac{B}{C}\right) + \left(\frac{R}{T}\right) + \left(\frac{C \times \frac{C}{D}}{T}\right)$$

(2) Hardness $= 1.00 - \left(\frac{E}{T}\right) - \left(\frac{F \times \frac{D}{T}}{T}\right)$ (3) Brittleness $= \frac{D - E}{T}$ (4) Toughness $= 1.00 - \left(\frac{D - E}{T}\right)$ By way of specific example the following data was obtained in an actual test, viz, T=246 lbs.; R=88 lbs.; D=158 lbs.; A=23 lbs.; B=65 lbs.; C=100 lbs.; E=42 lbs.; and F=58 lbs.

The foregoing data inserted in the above equations or formulas give the following results, viz, (1) Ultimate strength =
$$\left(\frac{23}{88} \times \frac{65}{100}\right) + \left(\frac{88}{246}\right) + \left(\frac{100 \times \frac{100}{158}}{246}\right) = .786$$

(2) Hardness =
$$1.00 - \left(\frac{42}{246}\right) - \left(\frac{58 \times \frac{158}{246}}{246}\right) = .678$$

(3) Brittleness $= \frac{158 - 42}{246} = .472$ (4) Toughness $= 1.00 - .472 = .528$ It will be understood, of course, that in carrying out my improved method of testing coke, other forms of apparatus than the one just described may be employed, so long as it is possible thereby to subject the coke, or other like material being tested, to prescribed abrasive, impact and compressive strains, and the particles or fragments thereby produced can be simultaneously removed. By then grading the resultant particles, both those passing through and those remaining in the drum in the case of the aforesaid specific apparatus, any or all of the physical qualities of interest may then be ascertained by means of appropriate empirical formulas, or equations, such as have hereinbefore been set forth.

It should be explained that physical properties of coke, such as strength, hardness, brittleness, etc., have never been satisfactorily defined; and emphasis might be placed on other qualities, such as resiliency instead of strength, or brittleness instead of hardness, etc. In other words, any common unit of measure that may be adopted is merely conventional. By the development, however, of a method of testing and apparatus for carrying on such method as hereinbefore described, I provide a means for establishing the units of measure, which I have called ultimate strength, hardness, brittleness and toughness, and these terms, once their significance has become established and a standard method for ascertaining same adopted, will afford an accurate and informative method for testing coke by which the values which determine its actual worth to the consumer may be fixed, particularly where the coke is employed for use in the smelting of metal bearing ores or the melting of metals, or in metallurgical operations in general.

The term "ultimate strength" as herein employed may be defined as denoting a measure of the physical power of resistance of coke to abrasive impact and compressive strains or stresses. Similarly the term "hardness" as herein employed may be defined as denoting a measure of the ability of coke to resist abrasion; and "brittleness" and "toughness" may be defined as denoting a measure of the ability of coke to resist impact and compressive strains or stresses.

It will be understood that various formulas may be developed by which the amounts of the particles in the several grades of a given quantity of coke, as divided by my improved method, may be substituted and it is a matter of indifference what particular term be applied to designate the qualities or physical properties revealed by such substitution. The result sought is the establishment of definite standards for evaluating coke or like materials which may be applied with assurance that uniform results which may be depended upon will always be obtained where the materials being tested are of the same value for the use to which they are to be put.

A fundamental objective in the design of the machine, wherein my improved method of testing is carried out, is, as exemplified in the apparatus illustrated, that the fragments of coke shall be removed as quickly as possible after they have been broken off. In other words, it is essential that such fragments should be removed before they are in turn subjected to the same kind of strains and stresses as caused them to be formed. Then by grading such fragments, together with the pieces left in the rotating drum, according to size and using the weight values obtained for each size in a properly designed empirical formula, it is possible to measure any of the physical properties of coke that govern its evaluation. In other words, I am able to measure the relative values of such physical properties by measuring the amounts of the various size particles produced inasmuch as such size is governed by such physical properties. Thus, fine dust and small pieces are the result of abrasion and therefore are indicative of the hardness of the coke being tested where, as in my apparatus, such dust and fine pieces are not the result of continued grinding or abrasive action, but are removed from the apparatus substantially as fast as they are formed. By thus measuring the amounts of the various sizes, I also measure the values of the physical properties which govern the fuel value of the coke because the effects upon the coke of the prescribed strains and stresses, by which the various physical properties are defined, are measured.

It makes no particular difference what terms are applied to designate such physical properties or what formulas are used, the outstanding facts being that my prescribed treatment will provide data which may be used in any manner of form to designate the physical properties of coke, and that it is possible to use such data in a certain manner which will show in a relative way the numerical values of the physical properties which govern the fuel value of coke.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of testing coke or like material, which consists in subjecting the same to prescribed physical strains or stresses, grading the resultant particles according to size, and substituting the weight values of such particles in the several grades in an empirical formula giving a defined physical quality of such material.

2. The method of testing coke or like material, which consists in subjecting the same to prescribed abrasive, impact and compressive strains or stresses, grading the resultant particles according to size, and substituting the weight values of such particles in the several grades in an empirical formula giving a defined physical quality of such material.

3. The method of testing coke or like material, which consists in subjecting the same to prescribed abrasive, impact and compressive strains or stresses, grading the resultant particles according to size, and substituting the weight values of such particles in the several grades in an empirical formula giving the ultimate strength of such material.

4. The method of testing coke or like material, which consists in subjecting the same to prescribed abrasive, impact and compressive strains or stresses, grading the resultant particles according to size, and substituting the weight values of such particles in the several grades in an empirical formula giving the hardness of such material.

5. The method of testing coke or like material, which consists in subjecting the same to prescribed abrasive, impact and compressive strains or stresses, grading the resultant particles according to size, and substituting the weight values of such particles in the several grades in an empirical formula giving the brittleness of such material.

6. The method of testing coke or like material, which consists in subjecting the same to prescribed abrasive, impact and compressive strains or stresses, grading the resultant particles according to size, and substituting the weight values of such particles in the several grades in an empirical formula giving the toughness of such material.

7. The method of testing coke or like material, which consists in subjecting the same to prescribed abrasive, impact and compressive strains or stresses, grading the resultant particles according to size, and substituting the weight values of such particles in the several grades in a series of empirical formulas, respectively giving the ultimate strength, hardness, brittleness and toughness of such material.

8. The method of testing coke or like material, which consists in subjecting a measured quantity of the same to prescribed abrasive, impact and compressive strains or stresses while supported on a perforated wall, screening the particles passing through such wall and remaining thereon, and then integrating the amounts of such particles in the several grades in an empirical formula giving a defined physical quality of such material.

9. The method of testing coke or like material, which consists in placing a measured quantity of the same in a drum having a perforated cylindrical wall and transversely disposed interior shelves adjacent such wall, rotating such drum in prescribed fashion, screening the particles passing through such drum and remaining therein, and then integrating the amounts of such particles in the several grades in an empirical formula giving a defined physical quality of such material.

Signed by me, this 15th day of Aug., 1921.

M. DONOVAN CURRAN.